Patented Jan. 31, 1939

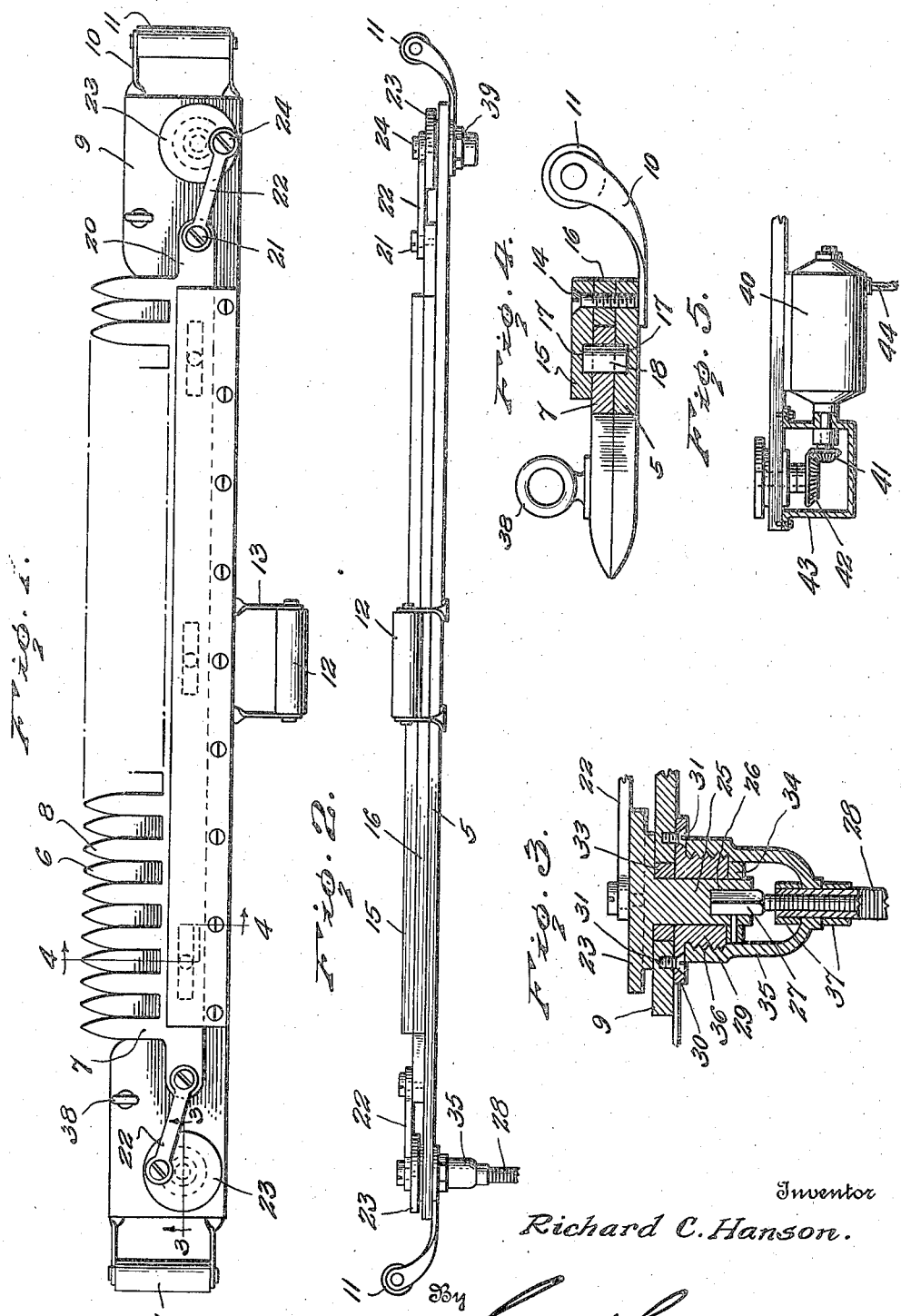

2,145,391

UNITED STATES PATENT OFFICE 2,145,391

HEDGE TRIMMER

Richard C. Hanson, Alexandria, Va.

Application November 13, 1937, Serial No. 174,454

10 Claims. (Cl. 30—215)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to hedge trimmers and has for its object to provide an inexpensive and thoroughly efficient device of this character by means of which a layman may quickly and evenly trim the top and sides of a privet or other growing hedge without requiring the services of a landscape gardener or other person skilled in the art of trimming shrubbery.

A further object of the invention is to provide a hedge trimmer which is manually guided and mechanically operated, the construction of the device being such that it may be supported and operated by either one or two persons as desired.

A further object is to provide a hedge trimmer including a reciprocating cutter bar having means at the opposite ends thereof for attachment to a source of power whereby the cutter may be operated from either side of a hedge, means being provided for guiding the cutter and preventing accidental displacement thereof during reciprocation of said cutter.

A further object is to provide the opposite ends of the stationary plate of the trimmer with depending threaded nipples through which the stub shafts of the cutter actuating disks extend for engagement with a flexible power shaft, said power shaft being provided with a terminal attaching cap adapted to selectively engage either threaded nipple according to the location of the source of power for said flexible shaft.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a top plan view of a hedge trimmer embodying the present invention,

Figure 2 is an edge view thereof,

Figure 3 is a vertical sectional view taken on the line 3—3 of Figure 1,

Figure 4 is a transverse sectional view taken on the line 4—4 of Figure 1, and

Figure 5 is a detail sectional view partly in elevation illustrating a modified form of the invention.

The improved hedge trimmer forming the subject-matter of the present invention comprises a longitudinally disposed stationary member or base plate 5 of any desired length and width and having one longitudinal edge thereof formed with spaced stationary teeth 6. Slidably mounted for reciprocating movement on the base plate 5 is a movable member or cutter bar 7 provided with laterally extending teeth 8 which coact with the stationary teeth 6 to cut or sever the shrubbery when the device is in operation. The opposite ends of the base plate 5 project longitudinally beyond the cutter bar to form flat terminal portions 9 to which are rigidly secured by strap irons 10 suitable supporting handles 11. A similar handle 12 is secured by strap irons 13 to the base plate 5 intermediate its ends so that, when one person is operating the trimmer, the latter may be supported in either a vertical or a horizontal position by grasping one of the terminal handles 11 and the intermediate handle 12. Secured to the base plate 5 by screws or similar fastening devices 14 is an overhanging retaining plate 15 and interposed between said retaining plate and base plate is a filler strip 16 also retained in position by the screws 14. If desired, however, a filler strip 16 may be formed integral with the base plate and the retaining plate 15 secured directly to said filler strip. The upper surface of the base plate 5 and the lower surface of the overhanging retaining plate 15 are formed with spaced registering guiding grooves 17 adapted to receive a pin or key 18 for the purpose of guiding the cutter bar in its reciprocating movement and preventing lateral displacement thereof. Any desired number of guiding grooves and keys may be provided, but it is preferred to use three of said pins and grooves, as best shown in Figure 1 of the drawing. The opposite ends of the cutter bar are formed with reduced extensions 20 on which are pivotally mounted at 21 the adjacent ends of suitable connecting rods or pitmans 22. The outer ends of the pitmans 22 are eccentrically mounted on flat rotating disks 23, as indicated at 24, so that, as the disks rotate, a reciprocating motion will be imparted to the cutter bar. The disks 23 are provided with depending stub shafts 25 having terminal angular sockets 26 formed in the lower ends thereof and adapted to receive the angular head 27 of a flexible power shaft 28 leading to a gas engine or other suitable source of power. Depending from the flat terminal portions 9 of the base plate 5 at the opposite ends thereof are threaded nipples 29 having lateral attaching flanges 30 secured to the base plate by screws or similar fastening devices 31. The stub shafts 25 are journaled in the adjacent nipples 29 so as to freely rotate therein and interposed between the nipples and the disks 23 are suitable bushings 33 which fit in openings in the base plate, as shown. Each stub shaft 25 is provided at its lower end with a stop collar or washer 34 which bears against the end of the adjacent nipple 29 and is keyed or otherwise rigidly secured to the stub shaft so as to prevent vertical movement of the stub shaft relative to the base plate. Mounted on the end of the power shaft 28 is a substantially bell-shaped cap or housing 35, the inner walls of which are threaded at 36 for detachable engagement with the threads on the adjacent nipple 29 so as to permit the power shaft to be readily coupled to or removed from the stub shaft at either end of the base plate. The power shaft 28 extends through the base of the housing or cap 25 and secured to the power shaft are spaced collars 37 which bear against the interior and exterior of the cap and serve to center the adjacent end of the power shaft therein and prevent accidental displacement of said power shaft. An eye or loop 38 is preferably secured to each terminal flat portion 9 of the base plate for engagement with an adjustable supporting strap so as to permit the hedge trimmer to be conveniently suspended from the back and shoulders of the user.

When trimming the top of a hedge, the device is supported in a horizontal plane with one hand engaging one of the terminal handles 11 and the other the intermediate handle 12. If the motor or other source of power is disposed on, say the left hand side of the hedge, the cap 35 of the power shaft is detachably engaged with the nipple 29 at the left hand end of the base plate 5 so that, when the motor is in operation, motion will be transmitted through the medium of the flexible shaft 28, adjacent stub shaft 25 and pitman rod 22 to the cutter bar to reciprocate the same. In order to trim the side of a hedge, the trimmer is supported in a vertical position and as the operator walks along parallel with the hedge, the cutter bar will be actuated to cut the shrubbery, as will be readily understood. If the motor or other source of power is located on the right hand side of the hedge, the cap 35 is secured to the nipple 29 on the right hand side of the base plate and it will here be noted that, when one nipple is connected with the cap 35, the other nipple will be engaged by a detachable closure cap 39 so as to protect the adjacent stub shaft and its associated parts from dirt and débris during the trimming operation. If desired, two persons can operate the trimmer and when used in this manner the operator on one side of the hedge will grasp one of the terminal supporting handles 11 while the operator on the other side of the hedge grasps the other handle so that the trimmer will be supported parallel with the top of the hedge.

In Figure 5 of the drawing, there is illustrated a modified form of the invention in which the trimmer is operated by electricity instead of by the flexible shaft 28. In this form of the device, a small electric motor 40 is supported on the lower surface of the base or stationary plate of the trimmer and is provided with a reducing gear or pinion 41 which engages a beveled pinion 42 secured to the adjacent end of the stub shaft. The pinion and reducing gear are housed within a protecting casing 43 and a conductor 44 leads from one end of the motor to a suitable source of electric energy so that as the motor 40 rotates motion will be imparted to the cutter bar, as will be readily understood.

The device is light in weight and compact in construction and may be readily operated by a layman for the purpose of cutting both the top and sides of a hedge without the expense of employing a landscape gardener or other persons skilled in the art of trimming shrubbery.

It will, of course, be understood that the trimmers may be made in different sizes and shapes and constructed of any suitable material without departing from the spirit of the invention.

Having thus described the invention, what is claimed as new is:

1. A hedge trimmer comprising a stationary member, a cutter bar mounted for reciprocation thereon, stub shafts journaled in the opposite ends of the stationary member, a power shaft adapted to selectively engage either stub shaft, and means for transmitting motion from the stub shafts to the cutter bar.

2. A hedge trimmer comprising a stationary member, a cutter bar mounted for reciprocation thereon, nipples depending from the stationary member at the opposite ends thereof, stub shafts journaled in said nipples, a power shaft for engagement with the stub shafts, a terminal cap carried by the power shaft and adapted to selectively engage either nipple, and means for transmitting motion from either stub shaft to the cutter bar.

3. A hedge trimmer comprising a stationary member, a cutter bar mounted for reciprocation thereon, nipples depending from the stationary member at the opposite ends thereof, stub shafts journaled in said nipples, a power shaft for engagement with the stub shafts, a terminal cap carried by the power shaft and adapted to engage one of the nipples, a closure cap adapted to engage the other nipple, and means for transmitting motion from either stub shaft to the cutter bar.

4. A hedge trimmer comprising a base plate having flat terminal portions provided with openings, supporting handles secured to said flat terminal portions, a cutter bar mounted for reciprocation on the base plate, bushings seated in said openings, threaded nipples depending from the base plate at the openings therein and bearing against the bushings, stub shafts journaled in the nipples and provided with terminal rotating disks, the lower ends of the stub shafts being provided with angular sockets, a power shaft having an angular head adapted to selectively engage the socket in either stub shaft, and a terminal cap carried by the power shaft and provided with threads for detachable engagement with the threads on the nipples.

5. A hedge trimmer comprising a stationary member having oppositely disposed handles, a cutter bar mounted for reciprocation on the stationary member, threaded nipples depending from the stationary member at the opposite ends thereof, stub shafts journaled in said nipples and provided with rotating disks, a pitman forming a connection between each disk and the adjacent end of the cutter bar, a flexible power shaft having means for detachable engagement with either stub shaft, and a cap carried by the power shaft and provided with threads adapted to engage the threads on either nipple.

6. A hedge trimmer comprising a stationary plate having terminal supporting handles and an intermediate supporting handle, a retaining plate carried by the stationary plate, a reciprocating bar slidably mounted between the stationary plate and said retaining plate, stub shafts journaled in the opposite ends of the stationary plate and having their upper ends provided with rotating disks, pitmans forming connections between the disks and cutter bar, the lower ends of the stub shafts being provided with angular sockets, and a flexible power shaft having an angular terminal adapted to selectively engage the socket of either stub shaft.

7. A hedge trimmer comprising a stationary plate having terminal supporting handles and an intermediate handle, there being a longitudinal guide groove formed in the upper surface of the stationary plate, a retaining plate overhanging said stationary plate and provided with a longitudinal guide groove registering with the guide groove in the stationary plate, a reciprocating cutter bar mounted for sliding movement between the stationary plate and retaining plate, a key carried by the cutter bar and operating within the adjacent grooves, threaded nipples depending from the stationary plate at the opposite ends thereof, stub shafts journaled in said bushings and provided with angular sockets, a flexible power shaft having an angular head adapted to selectively engage the angular socket of either stub shaft, and a cap carried by the power shaft and provided with a threaded portion adapted to engage the threads on the adjacent nipple.

8. A hedge trimmer comprising a stationary longitudinally disposed plate having one longitudinal edge thereof provided with stationary teeth and its opposite ends formed with flat terminal portions, supporting handles secured to said flat terminal portions, a reciprocating cutter bar mounted on the base plate and provided with reduced extensions, stub shafts journaled in the flat terminal portions, and having their lower ends formed with sockets and their upper ends provided with rotating discs, threaded nipples secured to the base plate and through which the stub shafts extend, a pitman forming a connection between each rotating disk and the adjacent extension of the cutter bar, a power shaft having an angular head adapted to selectively engage the socket of either stub shaft, and a threaded cap carried by the power shaft for detachable engagement with either of said nipples.

9. A hedge trimmer comprising a straight longitudinally disposed base plate having flat terminal portions, supporting handles secured to said terminal portions, a cutter bar mounted for reciprocation on the base plate, a retaining plate secured to the base plate and overhanging the cutter bar, a key and slot connection between the cutter bar and said base plate and retaining plate, strap-receiving loops formed on the flat terminal portions of the base plate, an intermediate supporting handle extending laterally from one longitudinal edge of the base plate, operating means mounted on each terminal portion of the base plate and operatively connected with the cutter bar, and means for supplying power to either operating means.

10. A hedge trimmer comprising a stationary base plate having an opening formed in one end thereof, a cutter bar mounted for reciprocation on said base plate, a bushing seated in said opening, a stub shaft extending through the bushing and having its upper end provided with a rotating disk and its lower end formed with an angular socket, a threaded nipple secured to the bottom of the base plate and through which the stub shaft extends, a collar on the lower end of the stub shaft and engaging the nipple, a connection between the rotating disk and cutter bar, a power shaft having an angular head engaging said socket, a threaded cap detachably engaging the nipple, and stop collars carried by the power shaft and bearing against the inner and outer faces of the cap.

RICHARD C. HANSON.